United States Patent
Griffin

(10) Patent No.: US 7,742,859 B2
(45) Date of Patent: Jun. 22, 2010

(54) METHOD FOR SETTING, CALIBRATING, AND VERIFYING AN OCCUPATION CLASSIFICATION SYSTEM THRESHOLD

(75) Inventor: Christopher Griffin, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/169,431

(22) Filed: Jul. 8, 2008

(65) Prior Publication Data

US 2008/0264143 A1 Oct. 30, 2008

Related U.S. Application Data

(62) Division of application No. 11/475,107, filed on Jun. 27, 2006, now Pat. No. 7,477,975.

(51) Int. Cl.
B60K 28/00 (2006.01)

(52) U.S. Cl. .......................... 701/45; 280/735; 180/273

(58) Field of Classification Search .................... 701/45; 180/271, 273; 280/728.1, 735
See application file for complete search history.

(56) References Cited

U.S. PATENT DOCUMENTS

| | | | |
|---|---|---|---|
| 6,479,766 B2 | 11/2002 | Gray et al. | |
| 6,609,054 B2 * | 8/2003 | Wallace | 701/45 |
| 6,629,445 B2 * | 10/2003 | Yamanaka et al. | 73/1.13 |
| 6,643,575 B2 | 11/2003 | Ishida et al. | |
| 6,771,175 B1 | 8/2004 | Eagle et al. | |
| 6,818,842 B2 | 11/2004 | Gray et al. | |
| 6,832,503 B2 | 12/2004 | Marentic et al. | |
| 6,836,754 B2 | 12/2004 | Cooper | |
| 7,043,997 B2 | 5/2006 | Mattson et al. | |
| 7,212,894 B2 * | 5/2007 | Hattori et al. | 701/45 |
| 7,295,910 B2 * | 11/2007 | Sakai et al. | 701/45 |
| 2005/0072618 A1 | 4/2005 | Gray et al. | |
| 2005/0090958 A1 | 4/2005 | Hattori et al. | |
| 2005/0154515 A1 * | 7/2005 | Wallace | 701/45 |
| 2006/0253238 A1 | 11/2006 | Murphy et al. | |
| 2007/0061102 A1 | 3/2007 | Kim | |

* cited by examiner

*Primary Examiner*—Mark Hellner
(74) *Attorney, Agent, or Firm*—O'Brien Jones, PLLC

(57) ABSTRACT

The invention is directed to a method for setting an occupant classification system threshold for a vehicle occupant detection system, the method comprising collecting occupant classification system data for a seat, the data being indicative of occupant weight, analyzing the data to determine where a separation exists between an occupant for which a restraint should be suppressed and an occupant for which the restraint should be deployed, and analyzing the data to determine a worst case child suppression weight and shape, which is based at least on where the separation exists. The worst case child suppression weight and shape define the occupant classification system threshold.

10 Claims, 6 Drawing Sheets

US 7,742,859 B2

METHOD FOR SETTING, CALIBRATING, AND VERIFYING AN OCCUPATION CLASSIFICATION SYSTEM THRESHOLD

This is a division of application Ser. No. 11/475,107, filed Jun. 27, 2006, now U.S. Pat. No. 7,477,975, which is incorporated herein by reference in its entirety.

BACKGROUND OF THE INVENTION

1. Field of Invention

This invention relates to the field of setting, calibrating, and verifying an occupant classification system (OCS) threshold. More specifically, this invention relates to a simplified and accurate method of setting an OCS threshold for a type of vehicle seat and then calibrating and verifying seats of the same type following manufacture.

2. Background

To limit the risk of death or serious injury in the event of a crash, many vehicles include passenger airbags, which are designed to deploy under certain crash conditions. Various types of sensors and crash criteria are commonly used to detect crash conditions for which passenger airbag deployment is desirable.

It is known that, even given a crash condition for which passenger airbag deployment is desirable, deployment of an airbag can itself cause injuries when the occupant of the passenger seat is a small child or infant. Accordingly, federal regulations have been developed requiring a system for determining whether a passenger seat is occupied by a small child or an infant, in which case airbag deployment should be suppressed.

In addition, if the passenger seat is unoccupied, deployment of the passenger airbag is unnecessary. Unnecessary deployment of the passenger airbag can increase the cost of repairing the vehicle.

Vehicle occupant detection systems judge whether, and how forcefully, to deploy a restraint such as a passenger airbag. One fundamental parameter in judging deployment is the weight of the seat occupant, as weight may be used to distinguish between an adult and an infant or small child. For example, Federal Motor Vehicle Safety Standard (FMVSS) 208 requires that an airbag be suppressed for a child less than six years old, but be deployed for an adult in the $5^{th}$ percentile. A $5^{th}$ percentile adult weighs, for example, 103-113 pounds standing, with a seated weight of about 77-85 pounds. A 6-year-old child weighs, for example, 52.5 pounds when seated. Thus, a separation exists between the seated weight of a small adult and a six year old child.

A known way of estimating occupant weight is by measuring pressure in a fluid-filled bladder disposed in or under a foam seat cushion. Increased weight on the seat increases pressure in the bladder. A pressure sensor connected to the bladder generates output signals indicative of pressure in the bladder and therefore occupant weight. Because a separation exists between the seated weight of a small adult and a 6-year-old, a separation similarly exists for pressure in the bladder and therefore the output signals of the pressure sensor.

In a crash situation, a microprocessor determines whether the output signals from the passenger seat pressure sensor exceeds a threshold value indicative of adult occupancy. If so, deployment of the passenger airbag is enabled. If not, it is assumed that the passenger seat is empty or the occupant of the seat is a small child or an infant, and deployment of the airbag is suppressed or limited accordingly.

Vehicle manufacturers must calibrate and verify calibration of these occupant detection systems. A conventional calibration and verification system applies a weight to the vehicle seat. Data corresponding to the applied weight is output from the seat's pressure sensor. The data is processed by a controller of the occupant detection system and calibration values are calculated, which include the threshold value indicative of adult occupancy. The calibration values are typically stored in an EEPROM. The weight is applied to the seat again, and the verification values are calculated again. If the calibration and verification values for the weight applications are within a specified tolerance, the occupant detection system is acceptable for use. This calibration and verification system can also be used to program the controller of the occupant detection system.

BRIEF SUMMARY OF THE INVENTION

In one embodiment, the invention is directed to a method for setting an occupant classification system threshold for a vehicle occupant detection system, the method comprising collecting occupant classification system data for a seat, the data being indicative of occupant weight, analyzing the data to determine where a separation exists between an occupant for which a restraint should be suppressed and an occupant for which the restraint should be deployed, and analyzing the data to determine a worst case child suppression weight and shape, which is based at least on where the separation exists. The worst case child suppression weight and shape define the occupant classification system threshold.

In another embodiment, the invention is directed to a method for calibrating an occupant classification system threshold for a vehicle occupant detection system, the method comprising collecting occupant classification system data for a seat, the data being indicative of occupant weight, analyzing the data to determine where a separation exists between an occupant for which a restraint should be suppressed and an occupant for which the restraint should be deployed, analyzing the data to determine a worst case child suppression weight and shape, which is based at least on where the separation exists, providing a weight drop head having the worst case child suppression shape, applying the worst case child suppression weight to a seat of the type for which the occupant classification system data was collected using the weight drop head having the worst case child suppression shape, recording a signal indicative of the applied worst case child suppression weight and shape, and recording the occupant classification system threshold based on the signal.

In yet another embodiment, the invention is directed to a method for verifying an occupant classification system threshold for a vehicle occupant detection system, the method comprising collecting occupant classification system data for a seat, the data being indicative of occupant weight, analyzing the data to determine where a separation exists between an occupant for which a restraint should be suppressed and an occupant for which the restraint should be deployed, analyzing the data to determine a worst case child suppression weight and shape, which is based at least on where the separation exists, providing a weight drop head having the worst case child suppression shape, applying the worst case child suppression weight to a seat of the type for which the occupant classification system data was collected using the weight drop head having the worst case child suppression shape, recording a first signal indicative of the applied worst case child suppression weight and shape, applying the worst case child suppression weight to the seat using the weight drop head having the worst case child suppression shape, recording a second signal indicative of the applied worst case child suppression weight and shape, and verifying that the first and second signals are within a specified tolerance.

In yet another embodiment, the invention is directed to a device for calibrating an occupant classification system threshold for a vehicle occupant detection system, the device comprises a force application mechanism, a weight drop head having a worst case child suppression shape and being attached to the force application mechanism, and controls that move the weight drop head and activate the force application mechanism to apply a force to a vehicle seat that is representative of a worst case child suppression weight for that seat. A pressure measurement device in the vehicle seat outputs a signal indicative of the applied force, the occupant classification system threshold being calibrated based on the signal.

Further features of the present invention, as well as the structure of various embodiments of the present invention are described in detail below with reference to the accompanying drawings.

BRIEF DESCRIPTION OF THE DRAWINGS

The accompanying drawings, which are incorporated herein and form part of the specification, illustrate the present invention and together with the description, further serve to explain the principles of the invention and to enable a person skilled in the pertinent art to make and use the invention. In the drawings, like reference numbers indicate identical or functionally similar elements.

DETAILED DESCRIPTION OF THE INVENTION

Figure 1:
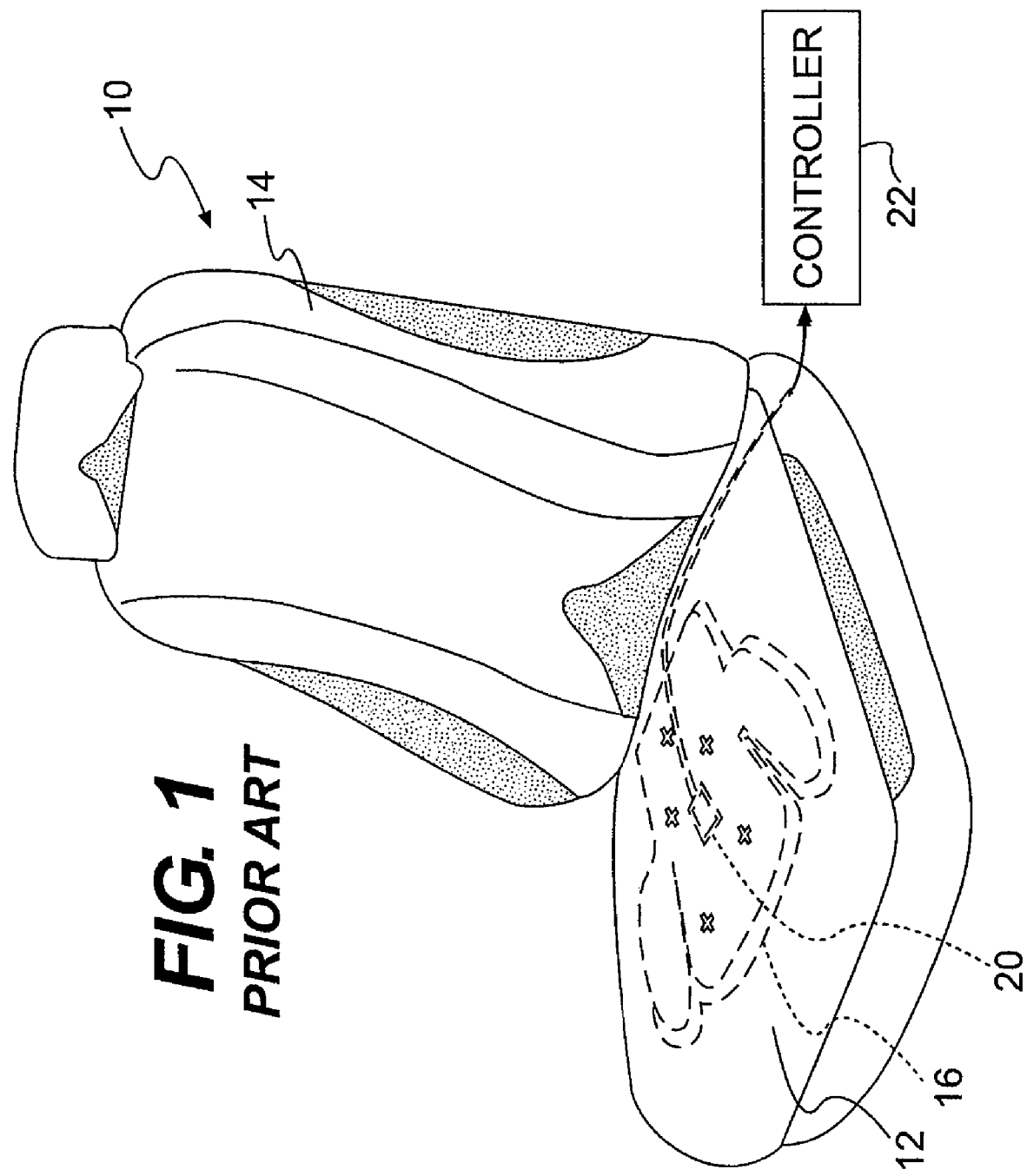
FIG. 1 illustrates a prior art vehicle seat including a fluid-filled bladder and an associated pressure sensor.

The present invention includes a device and a method for setting, calibrating, and verifying occupant classification system thresholds for a variety of conventional vehicle seats. A vehicle seat 10 typically includes a bottom cushion 12 and a back cushion 14. The cushions 12, 14 typically comprise foam. A bladder 16 is disposed in or under the bottom cushion 12 and commonly extends parallel with the central seating surface. The bladder 16 may contain a fluid such as silicone.

The bladder 16 is preferably coupled to a pressure sensor 20 that provides an electrical output signal indicative of the fluid pressure in the bladder 16, for example in the form of A/D counts. This pressure signal is provided as an input to a controller 22 that preferably can determine whether the seat 10 is unoccupied, occupied by a small child or an infant, or occupied by an adult. The determination of seat occupancy is preferably based on the bladder pressure and can additionally be based on other inputs, such as atmospheric pressure, temperature, and humidity. The pressure signal may additionally be used as a factor in determining how forcefully to deploy airbags or other pyrotechnically-deployed restraints during a crash event.

Other suitable pressure measurement devices may alternatively be employed, and may include a separate pressure sensor as needed.

Figure 2:
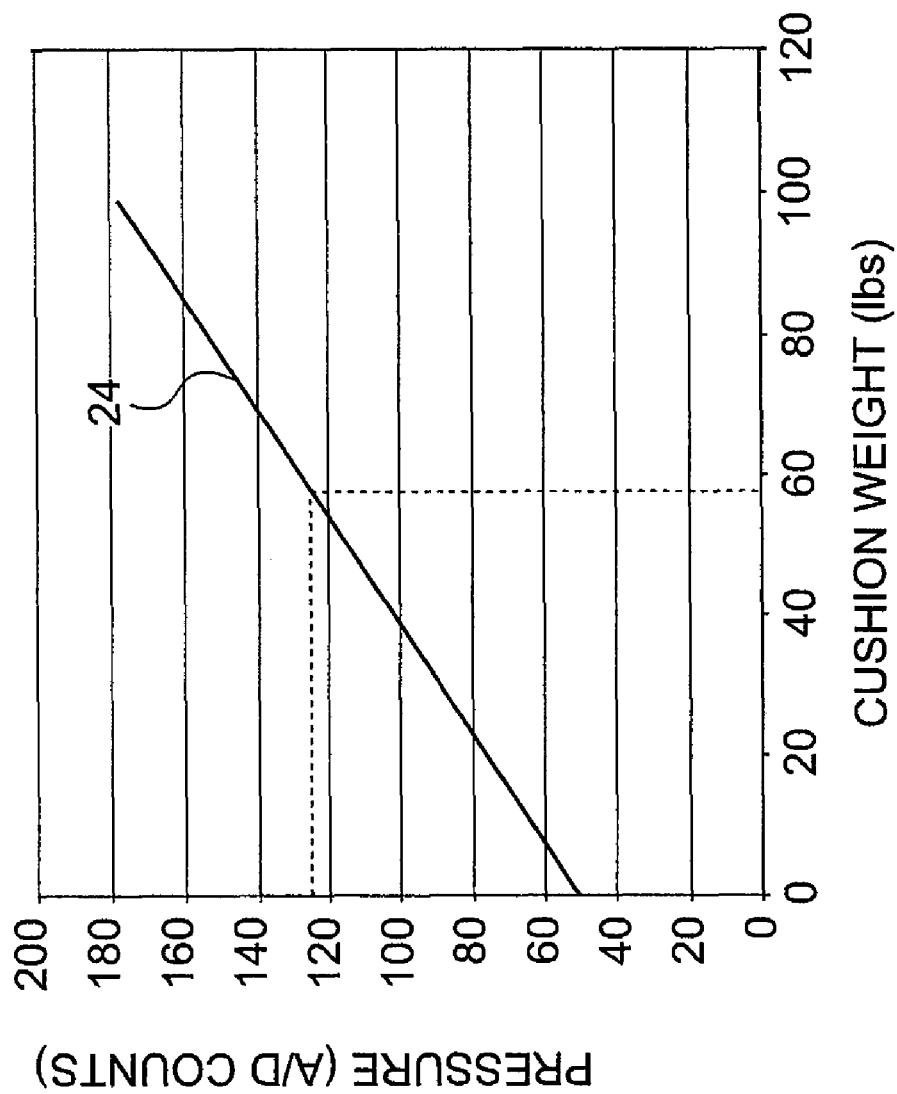
FIG. 2 graphically depicts pressure increasing monotonically with occupant weight applied to the fluid-filled bladder of FIG. 1.

In general, the fluid in the bladder 16 has a given nominal or unloaded pressure, which increases monotonically with occupant weight applied to the bottom cushion 12, as graphically depicted in FIG. 2. The line 24 represents the pressure (A/D counts) vs. weight (pounds) relationship of a given vehicle seat, which line varies for differing vehicle seats based on, for example, the shape and construction of the seat, and the location of the bladder within the seat.

Figure 3:
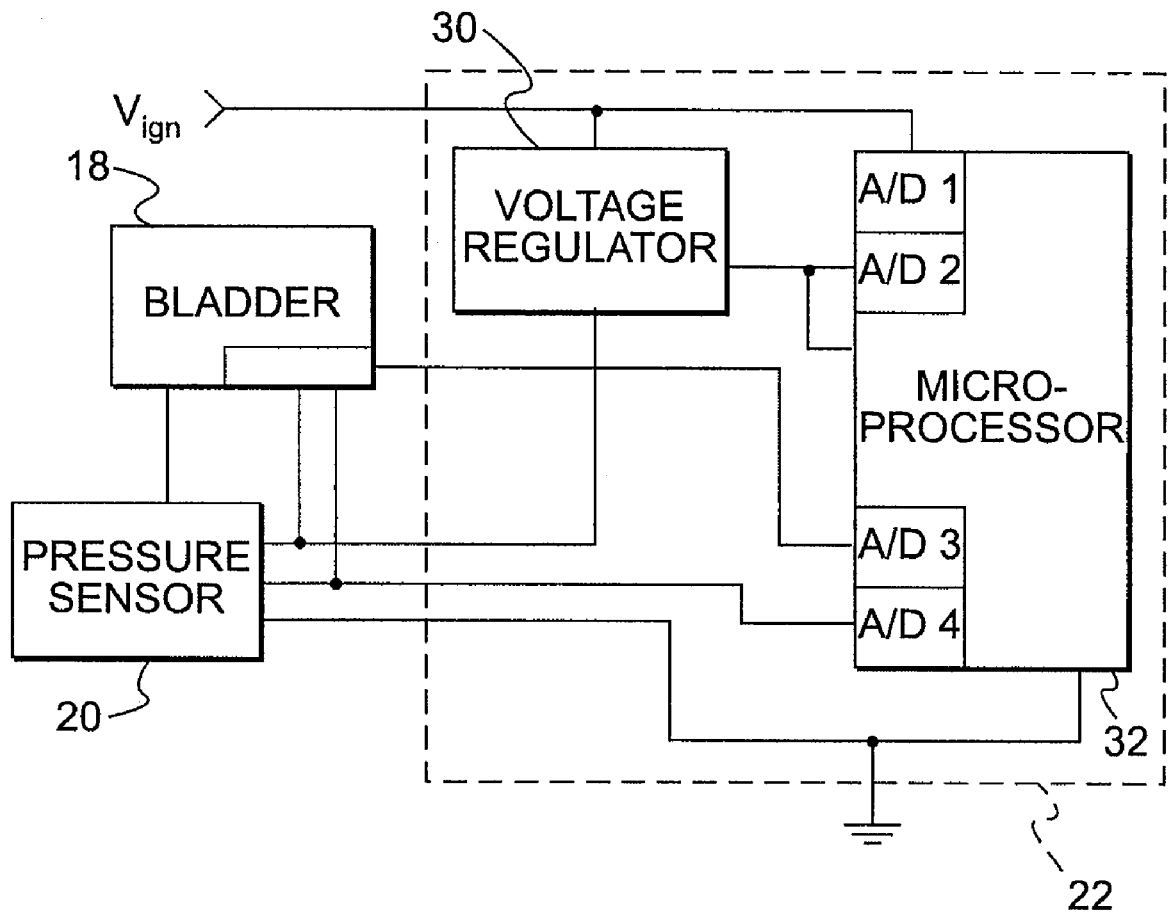
FIG. 3 schematically illustrates a prior art controller for receiving output from the pressure sensor of FIG. 1.

FIG. 3 shows an exemplary embodiment of an occupant weight detection system including a controller 22 that provides an output signal indicating whether airbag deployment should be inhibited or allowed based on at least a pressure reading indicative of occupant weight. A vehicle ignition voltage $V_{ign}$ is supplied to the controller 22, and a voltage regulator 30 provides a regulated system voltage. Regulated system and ground voltages are supplied to the pressure sensor 20 and a microprocessor 32. The microprocessor 32 has analog-to-digital (A/D) input channels that receive the ignition voltage $V_{ign}$, the system voltage from the voltage regulator 30, and the pressure sensor output voltage.

Loads applied to a vehicle seat can have different footprints. For example, the human body (or an anthropomorphic test dummy (ATD)) has a different footprint than a safety seat (which may include, for example, a rearwardly-facing infant seat (RFIS), a forward-facing child seat (convertible or non-convertible), and a booster seat). RFIS in general have varying footprints. Further, booster seats and forward-facing child seats can be used in passenger seats and have a variety of footprints. Different load footprints can cause different pressure signals for the same weight. For each type of seat, a "worst case" footprint can be determined. The worst case footprint is the footprint that produces the highest pressure reading for a given weight or class of occupant (e.g., a 12-month-old in a RFIS, a 3-month-old in forward-facing child seat, or a 6-year-old with or without a booster seat). The present invention contemplates determining a worst case footprint for each type of vehicle seat, and using that worst case footprint to set, calibrate, and verify the occupant detection system threshold for that type of seat.

Figure 4:
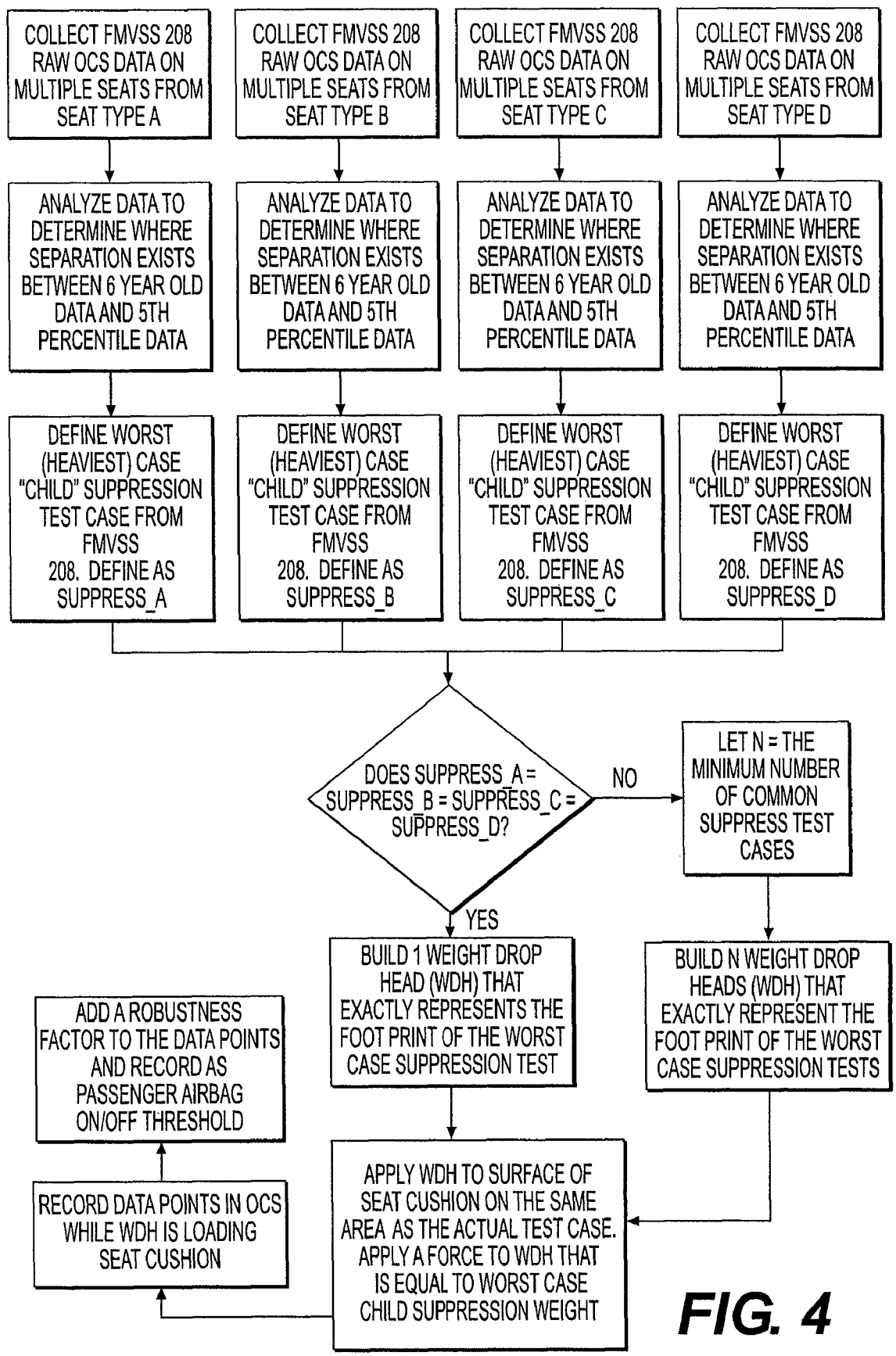
FIG. 4 is a flow chart showing an exemplary method of setting, calibrating, and verifying occupant classification system thresholds in accordance with the present invention.

FIG. 4 illustrates a method for setting and calibrating occupant detection systems for four types of vehicle seats, referred to as Type A, Type B, Type C, and Type D. Initially, FMVSS 208 raw OCS data is collected for at least one seat of each type. FMVSS 208 raw OCS data is collected for a seat by positioning different RFIS, forward-facing seats, boosters, and ATDs in the seat in one or more positions with appropriate weights as required by regulation. Appropriate weights presently include the weight off a 12-month-old for a RFIS, the weight of a 3-year-old (e.g., 34.5 lbs) for a forward-facing child seat, the weight of a 6-year-old (e.g., 52.5 lbs) for both a booster seat and an ATD, and the weight of a $5^{th}$ percentile adult (e.g., 108 lbs) for an ATD.

As an example, FMVSS 208 may require eight test cases for a 6-year-old, including four positions of an ATD (including leaning all the way back in a seat, reclining the seat back, and leaning against the vehicle door) and four different types of safety seats. Each of the required test cases is preferably performed for each seat according to regulation and the resulting data is collected for each seat in the form of A/D counts.

Next, for each seat type, the data is analyzed to determine where the separation exists between six year old data and $5^{th}$ percentile adult data. After the separation is identified, a "worst case child suppression" from FMVSS 208 is defined. The worst case child suppression is the weight and corresponding load footprint for which the highest pressure readings occur for a child or infant in an appropriate seat. The worst case child suppression cases are defined as Suppress_A, Suppress_B, Suppress_C, and Suppress_D. Suppress_A through Suppress_D correspond to the FMVSS test scenario that created the highest A/D count output from the pressure sensor 20. Typically, Suppress_A though Suppress_D is a 6-year-old, either in a booster or not.

After Suppress_A through Suppress_D are defined, they are compared to determine whether any or all of them are the same. If all of them are the same, the present invention contemplates building a single weight drop head, as described below, having a footprint representative of that worst case child suppression. If Suppress_A through Suppress_D are not same, a weight drop head is preferably built for each of the common worst case child suppressions. For example, if none of Suppress_A through Suppress_D are the same, four weight drop heads are preferably built.

The present invention also contemplates that there may be a degree of commonality that would allow a single weight drop head to be built for more than one of Suppress_A through Suppress_D based on a given degree of similarity, even though they are not exactly the same.

In a preferred embodiment of the invention, after a seat is manufactured, the weight drop head built for that seat type based on the worst case child suppression is applied to the surface of the bottom cushion 12 of the seat on the same area as the actual test case as defined above. A force is applied to the weight drop head that is representative of the appropriate worst case child suppression weight (e.g., 52.5 lbs for the representative 6-year-old, plus added weight for the booster seat if the worst case includes a booster seat). The pressure signal from the pressure sensor 20 is recorded in the seat's controller 22 for seat calibration during loading. Loading and pressure signal recordation preferably occurs a number of times for each seat, to create data points for that seat. In a particularly preferred embodiment of the invention, a robustness factor is added to the data points and recorded in the seat's controller as the passenger airbag ON/OFF threshold or the occupant classification system threshold. However, the present invention also contemplates the passenger airbag ON/OFF threshold being recorded based on the data points without using a robustness factor. The controller uses the passenger airbag ON/OFF threshold in determining an appropriate signal to send to the vehicle's safety system ECU.

Verification of the occupant classification system threshold can occur during or after calibration, and is achieved by the values of the data points being within a specified tolerance.

Figure 5:
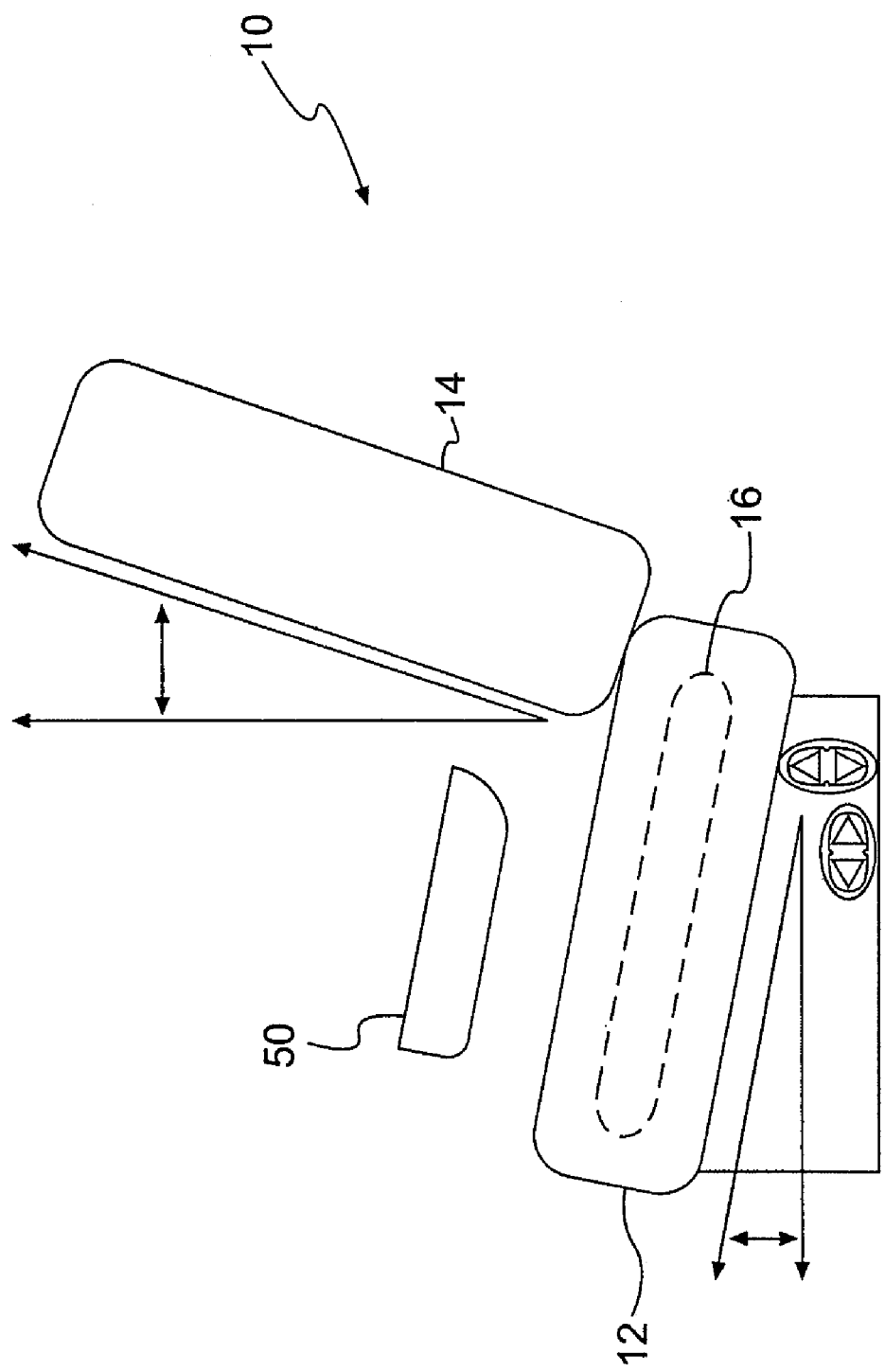
FIG. 5 illustrates a vehicle seat and an exemplary weight drop head designed in accordance with the present invention.

FIG. 5 represents a vehicle seat 10 and the factors that effect the pressure distribution of a given load on its bottom cushion 12 and therefore on the bladder 16 located in or under the bottom cushion 12. As can be seen, some of the factors effecting pressure distribution of a load on the bladder 16 include:

The position of the load on the bottom cushion 12 in both the X and Y directions (side-to-side and front-to-back, respectively).

The angle of the seat back cushion 14.

The angle of the seat bottom cushion 12.

Thus, when the weight drop head 50 built for a given seat type based on the worst case child suppression is to be applied to the surface of the bottom cushion 12 on the same area as the actual test case, the position of the weight drop head should preferably be the same with respect to at least the above three criteria.

Figure 6:
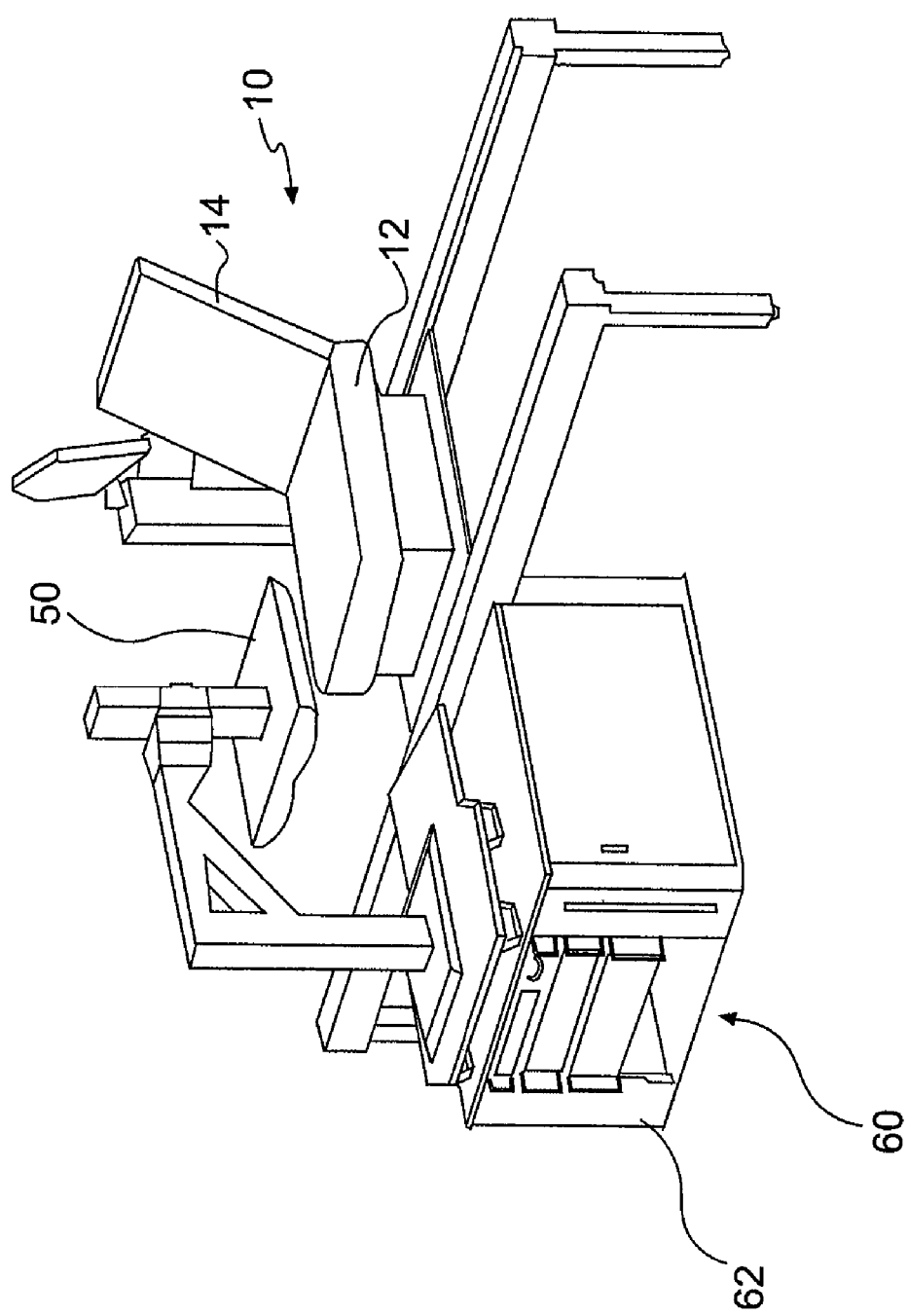
FIG. 6 illustrates an exemplary machine for utilizing the weight drop head of FIG. 5 to calibrate and verify occupant classification system thresholds in accordance with the present invention.

FIG. 6 discloses an exemplary embodiment of a weight drop head 50 and a calibrating machine 60 for utilizing the weight drop head 50 to apply a force to a seat 10. To calibrate and verify a manufactured vehicle seat 10 in accordance with the present invention, a weight drop head corresponding to the correct worst case child suppression is attached to the calibrating machine 60. The calibrating machine 60 includes controls 62 (not shown in detail) that move the weight drop head 50 to an appropriate position above the seat's bottom cushion 12 and lower the weight drop head 50 to apply a force equal to the worst case child suppression weight, via a force application mechanism, to the seat's bottom cushion 12 a predetermined number of times. During each application of a force, the pressure signal from the pressure sensor 20 is recorded in the seats controller 22 and used as specified above.

While known methods of seat calibration and verification use a weight reading, which requires normalization (i.e., conversion from pressure data to weight data), the present invention allows the seat to be calibrated and verified using only the pressure data, preferably in A/D counts.

What is claimed is:

1. A device for calibrating an occupant classification system threshold for a vehicle occupant detection system, the device comprising:
    a force application mechanism;
    a weight drop head having a worst case child suppression shape and being attached to the force application mechanism; and
    controls that move the weight drop head and activate the force application mechanism to apply a force to a vehicle seat that is representative of a worst case child suppression weight for that seat,
    wherein a pressure measurement device in the vehicle seat outputs a signal indicative of the applied force, the occupant classification system threshold being calibrated based on the signal.

2. The device of claim 1, wherein the worst case child suppression shape corresponds to the shape of a footprint of a rear-facing infant seat.

3. The device of claim 1, wherein the worst case child suppression shape corresponds to the shape of a forward-facing child seat.

4. The device of claim 1, wherein the worst case child suppression shape corresponds to the shape of a booster seat.

5. The device of claim 1, wherein the worst case child suppression shape corresponds to the shape of a child's rear end.

6. A device for setting, calibrating, and verifying an occupant classification system threshold for a vehicle occupant detection system, the device comprising:
    a force applicator;
    a weight drop head having a worst case child suppression shape and being attached to the force application mechanism;
    a pressure measurement device configured to measure a force applied by the force applicator and weight drop head; and
    controls configured to activate the force applicator to apply a force to the pressure measurement device that is representative of a worst case child suppression weight,
    wherein, when a force is applied to the pressure measurement device by the force applicator and weight drop head, the pressure measurement device outputs a signal indicative of the applied force for use in setting, calibrating, and verifying the occupant classification system threshold.

7. The device of claim 6, wherein the worst case child suppression shape corresponds to the shape of a footprint of a rear-facing infant seat.

8. The device of claim 6, wherein the worst case child suppression shape corresponds to the shape of a forward-facing child seat.

9. The device of claim 6, wherein the worst case child suppression shape corresponds to the shape of a booster seat.

10. The device of claim 6, wherein the worst case child suppression shape corresponds to the shape of a child's rear end.

* * * * *